US009052045B2

(12) United States Patent
Rosenblum et al.

(10) Patent No.: US 9,052,045 B2
(45) Date of Patent: Jun. 9, 2015

(54) FITTING ASSEMBLY HAVING SEPARATE SEAL AND BARB ARRANGEMENT FOR ENGAGING A FLEXIBLE PIPE

(71) Applicants: Yossi Rosenblum, Kibbutz Mishmar Hagenev (IL); Abed Masarwa, Taybi (IL)

(72) Inventors: Yossi Rosenblum, Kibbutz Mishmar Hagenev (IL); Abed Masarwa, Taybi (IL)

(73) Assignee: Netafim, Ltd., Tel Aviv (IL)

( * ) Notice: Subject to any disclaimer, the term of this patent is extended or adjusted under 35 U.S.C. 154(b) by 0 days.

(21) Appl. No.: 13/759,592

(22) Filed: Feb. 5, 2013

(65) Prior Publication Data
US 2013/0257042 A1    Oct. 3, 2013

Related U.S. Application Data

(63) Continuation-in-part of application No. PCT/IB2011/053545, filed on Aug. 9, 2011.

(60) Provisional application No. 61/372,097, filed on Aug. 10, 2010.

(51) Int. Cl.
*F16L 33/04* (2006.01)
*F16L 33/02* (2006.01)
*B21D 39/04* (2006.01)

(52) U.S. Cl.
CPC .................. *F16L 33/02* (2013.01); *B21D 39/04* (2013.01); *F16L 33/04* (2013.01)

(58) Field of Classification Search
CPC ....................................................... B21D 39/04
USPC .......... 285/242, 252, 253, 239, 241, 254, 256
See application file for complete search history.

(56) References Cited

U.S. PATENT DOCUMENTS

| 216,851 | A | * | 6/1879 | Hofmann | 285/238 |
|---|---|---|---|---|---|
| 858,575 | A | * | 7/1907 | Claflin | 285/253 |
| 2,139,745 | A | * | 12/1938 | Goodall | 285/253 |
| 2,453,997 | A | * | 11/1948 | MacWilliam | 285/256 |
| 3,174,777 | A | * | 3/1965 | Evans et al. | 285/252 |
| 3,578,360 | A | * | 5/1971 | Eliot | 285/256 |
| 3,653,692 | A | * | 4/1972 | Henson | 285/242 |
| 4,522,435 | A | * | 6/1985 | Miller et al. | 285/256 |
| 4,603,890 | A | * | 8/1986 | Huppee | 285/239 |
| 4,607,867 | A | * | 8/1986 | Jansen | 285/242 |

(Continued)

FOREIGN PATENT DOCUMENTS

| EP | 589413 A1 * | 3/1994 | F16L 33/207 |
|---|---|---|---|
| EP | 1 561 986 | 8/2005 | |

(Continued)

OTHER PUBLICATIONS

International Search Report and Written Opinion of PCT/IB2011/053545, dated Mar. 11, 2011.

*Primary Examiner* — David E Bochna
(74) *Attorney, Agent, or Firm* — Womble Carlyle

(57) ABSTRACT

A fitting assembly that can attach to an open end of a flexible pipe has a nipple and a clamp. For attachment, the pipe is fitted with its open end over the nipple and the clamp fits over the pipe where the pipe fits over the nipple. The nipple has a seal and a barb arrangement that is located rear to the seal. The seal and barb arrangement contact an inner face of the pipe. The clamp has an axial extension that is sized to overlie the barb arrangement and the seal in order to press the pipe against the barb arrangement and the seal.

13 Claims, 3 Drawing Sheets

(56) References Cited

U.S. PATENT DOCUMENTS

| | | | |
|---|---|---|---|
| 5,076,615 A * | 12/1991 | Sampson | 285/253 |
| 5,487,571 A * | 1/1996 | Robertson | 285/259 |
| 5,601,317 A | 2/1997 | Crouse et al. | |
| 6,010,162 A * | 1/2000 | Grau et al. | 285/256 |
| 6,155,302 A * | 12/2000 | Fischerkeller et al. | 285/242 |
| 6,361,082 B1 | 3/2002 | Hauki et al. | |
| 6,443,500 B1 * | 9/2002 | Inoue et al. | 285/256 |
| 6,450,549 B1 * | 9/2002 | Schutz | 285/256 |
| 6,523,862 B1 * | 2/2003 | MacDuff | 285/256 |
| 6,561,550 B1 * | 5/2003 | Kiraz | 285/259 |
| 7,090,255 B2 * | 8/2006 | Clarke et al. | 285/252 |
| 7,384,074 B2 * | 6/2008 | He | 285/256 |
| 7,455,324 B2 * | 11/2008 | Inoue | 285/242 |
| 8,091,928 B2 * | 1/2012 | Carrier et al. | 285/242 |
| 8,628,118 B2 * | 1/2014 | Bobenhausen | 285/239 |
| 2002/0024218 A1 * | 2/2002 | Manuli | 285/256 |
| 2004/0222630 A1 * | 11/2004 | Katayama et al. | 285/239 |
| 2010/0102551 A1 | 4/2010 | Zeiber | |
| 2013/0214528 A1 * | 8/2013 | Mitterer et al. | 285/242 |
| 2014/0015247 A1 * | 1/2014 | Sorbi | 285/256 |

FOREIGN PATENT DOCUMENTS

| | | | |
|---|---|---|---|
| EP | 1 775 507 | 4/2007 | |
| FR | 1 158 142 | 6/1958 | |
| GB | 2177769 A * | 1/1987 | F16L 21/06 |

* cited by examiner

FITTING ASSEMBLY HAVING SEPARATE SEAL AND BARB ARRANGEMENT FOR ENGAGING A FLEXIBLE PIPE

RELATED APPLICATIONS

This is a Continuation-in-part of PCT/IB2011/053545, filed 9 Aug. 2011 and published as WO 2012/020372A1, which claims priority to U.S. Provisional patent application No. 61/372,097, filed 10 Aug. 2010. The contents of the aforementioned applications are incorporated by reference in their entirety.

TECHNICAL FIELD

Embodiments of the invention relate to a fitting assembly for attachment to an open end of a flexible pipe.

BACKGROUND

Fitting assemblies for flexible pipe systems such as those used in an irrigation system can be designed to connect to an open end of a pipe. Such fittings may be used for example to couple between two pipe sections or between a pipe section and an irrigation element, or to block or restrict the exit of fluid from an open end of a pipe section. A fitting assembly may engage locations inside and outside of the pipe in order to secure itself to the open end of the pipe and at these locations the pipe wall may be deformed.

U.S. Pat. No. 5,601,317 describes a fitting with barbs on its outer side that is received in a hose and a clamp that is circumferentially mounted on the hose and preferably positioned over at least two of the barbs.

SUMMARY

The following embodiments and aspects thereof are described and illustrated in conjunction with systems, tools and methods which are meant to be exemplary and illustrative, not limiting in scope.

In an embodiment there is provided a fitting assembly for attachment to an open rear end of a pipe, the fitting assembly comprising a nipple and a clamp. The pipe is fitted with its open end facing axially rearwardly over the nipple and the clamp is adapted to fit over the pipe where the pipe fits over the nipple. The nipple comprises a seal and a barb arrangement that is located rear to the seal, the seal and the barb arrangement being adapted to contact an inner face of the pipe and the clamp having an axial extension that is sized to overlie the barb arrangement and the seal so that the clamp can be tightened to press the pipe against the barb arrangement and the seal.

Optionally, the fitting comprises a stop located rear to the barb arrangement, and the pipe when being fitted over the nipple can be urged rearwardly up to a terminal position where its rear end is at the stop.

Optionally, the axial extension of the clamp is sized to overlie the seal and the barb arrangement when the clamp is fitted to the pipe and nipple with its rear end at the stop.

Optionally, the nipple comprises a rim located forward to the seal and the pipe when fitted on the nipple forms a bulge where it is seated on the rim, and the axial extension of the clamp is also sized to overlie the seal and the barb arrangement when the clamp is fitted to the pipe and nipple with its forward end at the bulge.

Optionally, the barb arrangement comprises a forward segment that engages the pipe and that forward segment has an axial distance to the stop that is smaller than its axial distance to the seal.

Optionally, the barb arrangement comprises a plurality of axially spaced apart barbed teeth and the forward most barbed tooth is the forward segment of the barb arrangement.

Optionally, each barbed tooth comprises a circumferentially extending gap formed therein and the gaps formed in the barbed teeth form a path that extends from a location forward of the barb arrangement to a location rear of the barb arrangement that is in communication with the outside environment.

In an embodiment there is also provided a method of coupling a fitting assembly to a pipe comprising the steps of: providing a fitting assembly that comprises a nipple and a clamp, the nipple comprising a seal and a barb arrangement that is located axially rearwardly to the seal and the clamp having an axial extension that is sized to overlie the barb arrangement and the seal, fitting a pipe with an open end thereof facing axially rearwardly over the nipple, and tightening the clamp to press the pipe against the barb arrangement and the seal.

Optionally, the fitting comprises a stop located rear to the barb arrangement and the pipe when being fitted over the nipple can be urged rearwardly up to a terminal position where its rear end is at the stop.

Optionally, the barb arrangement comprises a forward segment that engages the pipe and that forward segment has an axial distance to the stop that is smaller than its axial distance to the seal.

In addition to the exemplary aspects and embodiments described above, further aspects and embodiments will become apparent by reference to the figures and by study of the following detailed descriptions.

BRIEF DESCRIPTION OF THE FIGURES

Exemplary embodiments are illustrated in referenced figures. It is intended that the embodiments and figures disclosed herein are to be considered illustrative, rather than restrictive. The invention, however, both as to organization and method of operation, together with objects, features, and advantages thereof, may best be understood by reference to the following detailed description when read with the accompanying figures, in which.

Figure 1:
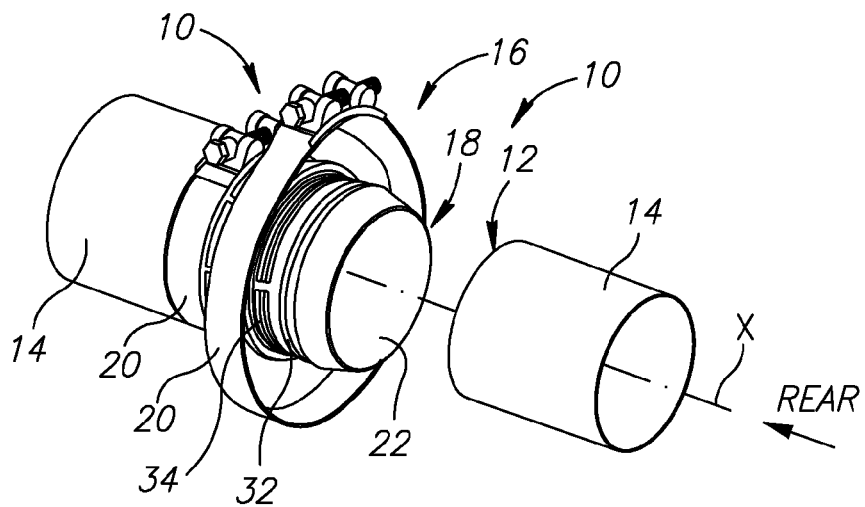
FIG. 1 shows a perspective view of a coupling including two fitting assemblies in accordance with an embodiment of the invention for attachment to open ends of two pipe sections, wherein all the parts of the fitting assembly on the right are displayed with this fitting assembly being shown detached from its pipe section.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated within the figures to indicate like elements.

DETAILED DESCRIPTION

Figure 2:
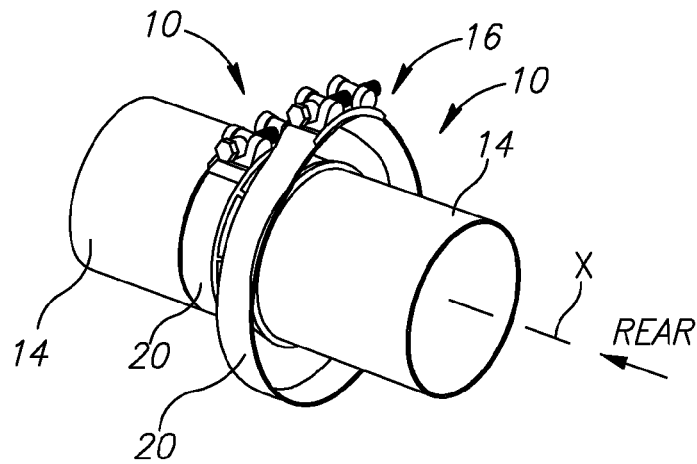
FIG. 2 shows the fitting assembly on the right after its pipe section has been urged onto a nipple of the fitting assembly.
Figure 3:
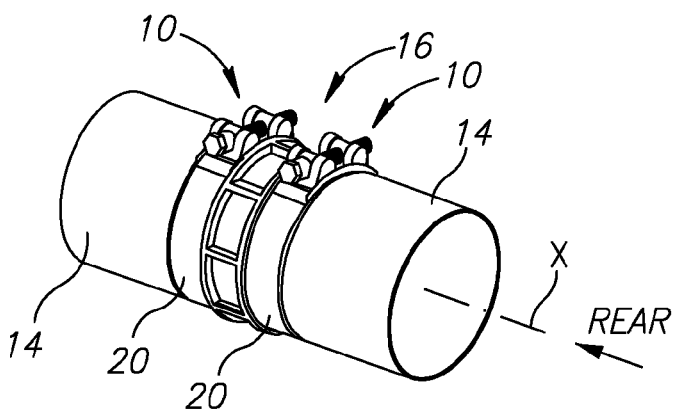
FIG. 3 shows the fitting assembly on the right after a clamp of the fitting assembly has been tightened onto the pipe section.

Attention is first drawn to FIGS. 1 to 3. A fitting assembly 10 in accordance with an embodiment of the present invention can be used in an irrigation system for attachment to an open rear end 12 of a flexible pipe section 14, the arrow in FIG. 1 pointing in the rear direction. The fitting assembly 10 can be used in various configurations of irrigation accessories and in the example shown in these figures it is seen how two such fitting assemblies 10 can be part of a coupling accessory 16 that connects two pipe sections 14 one to the other. The term pipe section 14 when used herein refers to any length of irrigation pipe that is typically used in an irrigation system and to which it may be required to attach the fitting assembly 10.

The fitting assembly 10 on the right side of the coupling 16 in these figures is shown in various stages of attachment to its associated pipe section 14. In an embodiment, the fitting assembly 10 has a nipple 18 and a clamp 20. The nipple 18 is formed about an axis X and surrounds an optional passage 22, and the pipe section 14 can be urged with its open end 12 facing axially rearwardly to be fitted over the nipple 18 (FIG. 2). The fitting of the pipe section 14 onto the nipple 18 may be formed for example by axially urging the nipple 18 forwardly to fit into the open end 12 of the pipe section 14 to thereby urge the pipe section 14 to be fitted with its open end 12 facing axially rearwardly onto the nipple 18, or by urging the pipe section 14 axially rearwardly with its open end 12 leading to fit over the nipple 18, or by urging both the nipple 18 and the pipe section 14 axially towards each other so that the pipe section 14 is fitted onto the nipple 18 with its open end 12 facing axially rearwardly.

The clamp 20 may be loosely placed circumferentially around a portion of the pipe section 14 that is fitted on the nipple 18, and then tightened to press against that portion in order to secure the pipe section 14 to the fitting assembly 10 (FIG. 3). It should be noted that directional terms appearing throughout the specification and claims, e.g. "forward", "rear", "up", "down" etc., (and derivatives thereof) are for illustrative purposes only, and are not intended to limit the scope of the appended claims. In addition it is noted that the directional terms "down", "below" and "lower" (and derivatives thereof) define identical directions.

Figure 4A:
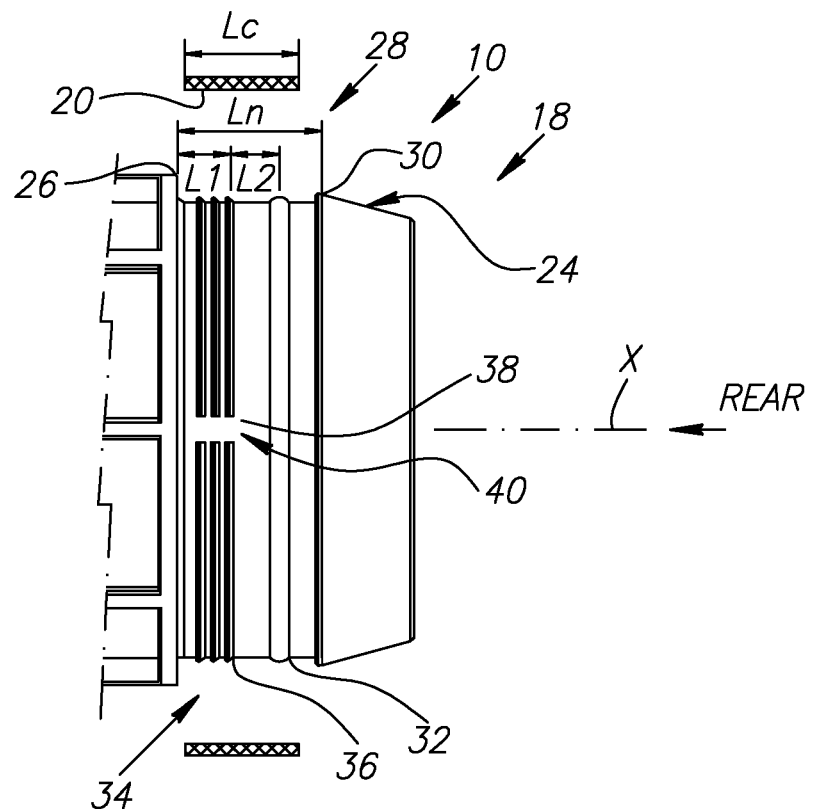
FIG. 4A shows a side view of the fitting assembly with the clamp being shown in a loose state and in cross section.
Figure 4B:
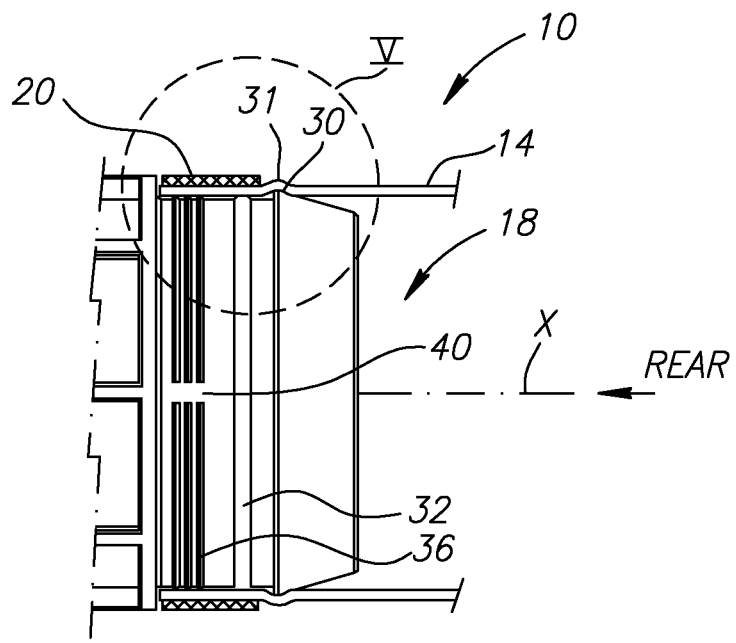
FIG. 4B shows the fitting assembly of FIG. 4 with the clamp being tightened to a pipe section that is shown in cross section.

Attention is drawn to FIGS. 4A and 4B. The nipple 18 of the fitting assembly 10 has a forward head 24, a rear stop 26 and a neck portion 28 therebetween. The stop 26 generally extends radially outward of the neck portion 28 along at least a portion of the circumference of the neck portion 28 so that it can arrest rearward progress of a pipe 14 being mounted on the nipple 18. The head 24 has a truncated coned shape that tapers forwardly from a peripheral rim 30 and the pipe 14 where it is fitted and seated over the rim 30 is flexed to form a bulge 31 that can be seen or sensed by a person using the fitting 10. The neck portion 28 is generally cylindrically shaped and includes a raised peripheral seal 32 and a raised peripheral barb arrangement 34 that is located rear to the seal 32. It is understood that in the embodiment shown, the barb arrangement 34, the seal 32 and the rim 30 are integrally formed to have one-piece unitary construction with the remainder of the nipple 18, though in other embodiments one or more of these may be separately formed and mounted on the neck portion 28.

In an embodiment, the barb arrangement 34 has a series of adjacent parallel and axially spaced apart barbed teeth 36 that extend peripherally about the axis X upon the outer periphery of the neck portion 28. Optionally, each barbed tooth 36 has at least one gap 38 that is formed therealong as it extends circumferentially about the axis X and the gaps 38 are optionally formed along the barbed teeth 36 at similar angular positions so that they are aligned to form a straight path 40 in the axial direction which is free of projecting barbed teeth 36 and extends axially through the barb arrangement 34 along the outer periphery of the neck portion 28. Further optionally, the gaps 38 may be formed along the barbed teeth 36 at different angular positions so as to form a "zigzagged" path 40 (not shown) that passes through the barb arrangement 34.

Attention is specifically drawn to FIG. 4A. Along the axis X of the fitting assembly 10, the following distances between elements of the fitting 10 may be defined. A forward segment of the barb arrangement 34 that in this optional case is the barbed tooth 36 that is most forward and closest to the seal 32 is located at an axial distance L1 from the stop 26 of the fitting 10, the seal 32 is located at an axial distance L2 from that forward segment of the barb arrangement 34, the axial length of the neck portion 28 as measured between the rim 30 and the stop 26 is Ln, and the axial size of the clamp 20 when oriented in a position similar to when fitted to the nipple 18 is Lc.

In the fitting assembly 10 the barbed teeth 36 are adapted to engage the inner face of the pipe section 14 in order to secure the pipe section 14 thereto, and the seal 32 is adapted to engage the inner face of the pipe section 14 in order to seal the pipe section 14 where it is fitted over the nipple 18 against egress of fluid from the pipe section 14 that may be present in the pipe section 14 under pressure. To increase the engagement between the nipple 18 and the inner face of the pipe section 14 it is possible to loosely position the clamp 20 over the pipe section 14 where it fits over the nipple 18 and then tighten the clamp 20 around the pipe section 14 in order to press the pipe section 14 against the nipple 18.

Figure 5A:
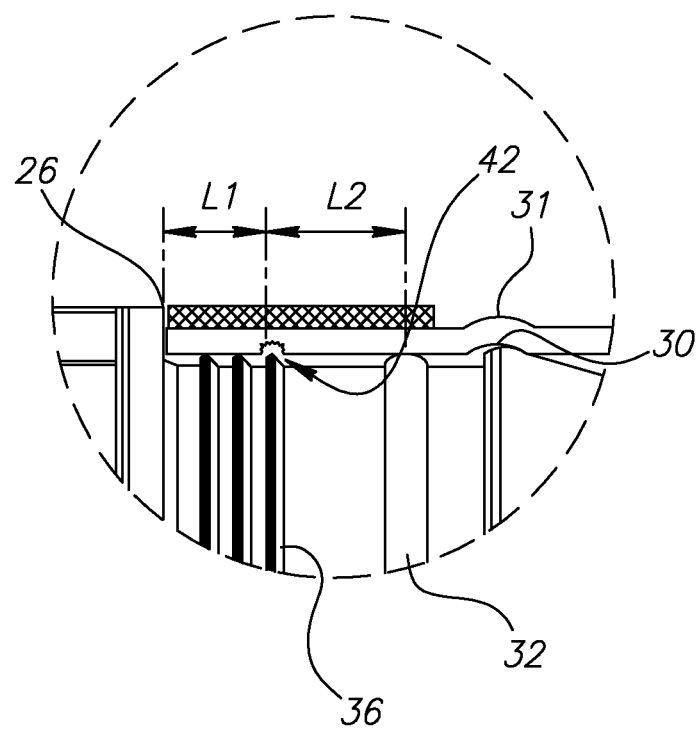
FIGS. 5A and 5B both show a section of FIG. 4B with the pipe section being respectively shown fully and partially positioned on the nipple.

By way of an example, optionally Lc, Ln, L1 and L2 satisfy the following relationships in order to ensure that the clamp 20, as it is tightened upon the pipe section 14 and nipple 18, is located above the barbed teeth 36 and the seal 32. Lc≤Ln so that the clamp 20 may be sized to fit within the axial dimension of the neck portion 28 of the fitting 10, Lc>L1+L2 so that the clamp 20 as it is aligned at its rear end at the stop 26 will still bear against the seal 32 and the barbed teeth 36, and in addition in an embodiment Lc is sized to overlie the seal 32 and barbed teeth 36 simultaneously when it is aligned at its forward end to the rim 30 (or bulge 31). Attention is drawn to FIGS. 5A and 5B. During use, the pipe section 14 where secured to the fitting 10 may receive a cut 42 at its inner face that is caused by the barbed teeth 36 that are adapted to deform and/or "dig" in to the inner face of the pipe section 14 in order to grip the pipe section 14 securely to the fitting 10. Such a cut 42 if exposed to fluid under pressure at a location for example forward to the seal 32 may form a breach through which fluid may seep into the wall of the pipe section 14 and damage the pipe section 14 or may form a weak point in the wall of the pipe section 14 that may fail when exposed for example to fluid under pressure. In the case where the fluid from the pipe section 14 manages to pass the seal 32 to a position rear of the seal 32, the path 40 that is formed through the barbed arrangement 34 serves as a passage through which the fluid may escape to communicate with the outside environment to thereby avoid build up of fluid pressure at a location where such a potential cut 42 may exist.

Typically, the fitting assembly 10 enables "free" detachment and re-attachment of a given pipe section 14 thereto as required, and a person attaching or re-attaching the pipe section 14 to the fitting 10 by urging the pipe section 14 to fit over the nipple 18 is expected to visibly see and ensure that at least the forward segment of the barb arrangement 34 on the nipple 18 is covered by the pipe section 14 in order for the fitting assembly 10 to function to both grasp and seal the connection to the pipe section 14. This forward segment of the barb arrangement 34 in the embodiments of the fitting assembly 10 that are discussed is optionally the barbed tooth 36 that is closest to the seal 32.

Figure 5B:
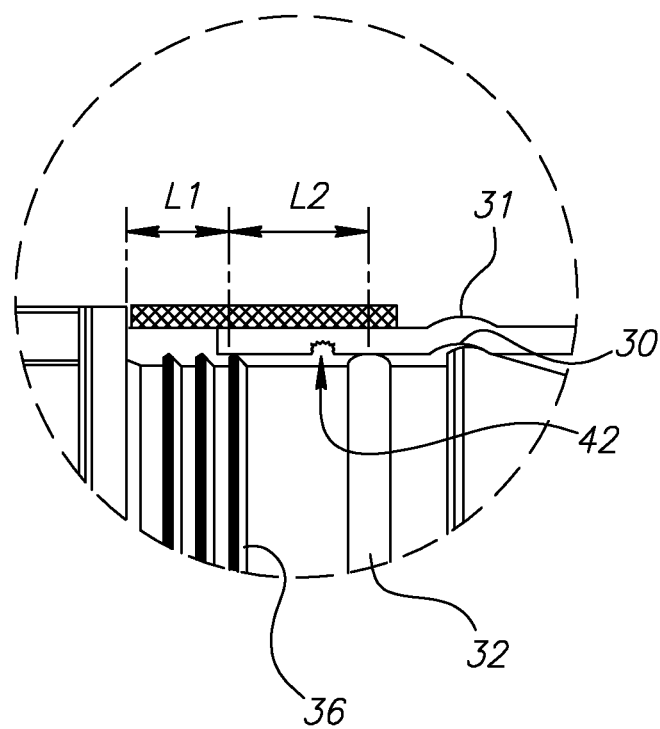

Now, in order to make sure that such a cut 42 that is made in the pipe section 14 does not "migrate" to a location forward of the seal 32, the inventors have examined the two "extreme" positions that the pipe section 14 can be placed on the nipple 18 while still being at least partially grabbed by the barb arrangement 34 and sealed by the seal 32. In the first "extreme" position the pipe section 14 is fully placed on the nipple 18 with its rear end at the stop 26 (FIG. 5A) and in the second "extreme" position the pipe section 14 is partially placed over the nipple 18 with its rear end just covering the barbed tooth 36 closest to the seal 32 (FIG. 5B).

The examination of these two 'extremities' resulted in an embodiment of a fitting 10 that is designed to have a distance L1 that is smaller than the distance L2 in order to ensure that such undesired "migration" of the cut 42 to a position forward of the seal 32 is not possible under the assumption that the person using the fitting 10 visibly ensures that at least one barbed tooth 36 is covered by the pipe section 14.

In another embodiment (not shown), the nipple is double-ended and comprises two oppositely facing nipple portions, each nipple portion having a barb assembly, a seal and a rim, the double-ended nipple having minor symmetry about a stop which is shared by the nipple portions. In such case, the fitting assembly comprises the double-ended nipple and two clamps for connecting to two flexible pipes, one to each of the nipple portions.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

Although the present embodiments have been described to a certain degree of particularity, it should be understood that various alterations and modifications could be made without departing from the scope of the invention as hereinafter claimed.

What is claimed is:

1. A fitting assembly for attachment to a pipe having an open rear end, the fitting assembly comprising a nipple and a clamp,
    the pipe being fitted with its open end facing axially rearwardly over the nipple,
    the clamp being adapted to fit over the pipe where the pipe fits over the nipple,
    the nipple comprising a single seal and a barb arrangement, the barb arrangement comprising a plurality of axially spaced apart barbed teeth located rearward of the seal, the forwardmost barbed tooth of the plurality of barbed teeth being spaced from the seal;
    the seal and the barb arrangement being adapted to contact an inner face of the pipe, and
    the clamp having an axial extension that is sized to overlie the barb arrangement and the seal so that it can be tightened to press the pipe against the barb arrangement and the seal,
    wherein the fitting assembly further comprises:
    a stop located rear to the barb arrangement, wherein
        the pipe, when being fitted over the nipple, can be urged rearwardly up to a terminal position where the pipe's rear end is at the stop, and
    the axial extension of the clamp is sized to overlie the seal and the barb arrangement, when the clamp is fitted to the pipe and nipple with the clamp's rear end at the stop, and
    the nipple comprises a rim located forward of the seal;
    the pipe, when fitted on the nipple, forms a bulge that can be seen or sensed where the hose is seated on the rim; and
    the axial extension of the clamp is also sized to overlie both the seal and the barb arrangement, when the clamp is fitted to the pipe and nipple with a forward end of the clamp immediately rearward of the bulge.

2. The fitting assembly according to claim 1, wherein:
    a first axial distance L1 between the forwardmost tooth and the stop is smaller than a second axial distance L2 between the forwardmost tooth and the seal.

3. The fitting assembly according to claim 2, wherein:
    each barbed tooth comprises circumferentially extending gap formed therein; and
    the gaps formed in the barbed teeth form a path that extends from a location forward of the barb arrangement to a location rear of the barb arrangement that is in communication with the outside environment.

4. The fitting assembly according to claim 1, wherein:
    the clamp does not overlie any barb forward of the seal, when the clamp is so fitted.

5. The fitting assembly according to claim 4, wherein:
    the forwardmost barbed tooth of the plurality of barbed teeth are spaced from the stop by a distance L1 and spaced from the seal by a distance L2, L2 being greater than L1.

6. The fitting assembly according to claim 1, where in the nipple further comprises a head having a truncated cone shape that tapers forwardly from the rim.

7. A method of coupling a fitting assembly to a pipe having an open rear end, the method comprising the steps of:
    providing a fitting assembly that comprises a nipple and a clamp, the nipple comprising a single seal and a barb arrangement, the barb arrangement comprising a plurality of axially spaced apart barbed teeth located rearward of the seal, the forwardmost barbed tooth of the plurality of barbed teeth being spaced from the seal, and the clamp having an axial extension that is sized to overlie the barb arrangement and the seal, wherein a first axial distance L1 from the forwardmost tooth to the stop is smaller than a second axial distance L2 from the forwardmost tooth to the seal,
    fitting a pipe with its open rear end facing axially rearwardly over the nipple, and
    tightening the clamp to press the pipe against the barb arrangement and the seal.

8. The method according to claim 7, wherein:
    the fitting comprises a stop located rear to the barb arrangement; and
    the method comprises urging the pipe rearwardly over the nipple up to a terminal position where pipe's rear end is at the stop.

9. A fitting assembly for attachment to a pipe having an open rear end, the fitting assembly comprising:
    a nipple having a forward head, a neck portion extending in a rear direction relative to the forward head, a single circumferentially extending seal and a barb arrangement spaced apart from one another and formed on the neck portion, the barb arrangement comprising a plurality of axially spaced apart barbed teeth located rearward of the seal, the forwardmost barbed tooth of the plurality of barbed teeth being spaced from the seal, the barb arrangement being adapted to contact an inner face of a pipe; and a clamp having a front end, a rear end and an axial length Lc that is sized to overlie both the barb arrangement and the seal simultaneously so that, when a pipe is fitted to the nipple with the pipe's open rear end facing axially rearwardly, the clamp can be tightened to press the pipe against both the barb arrangement and the seal simultaneously, wherein the nipple further comprises a rim located forward of the seal and a stop located rearward of the barb arrangement, and a first axial distance L1 between the forwardmost tooth and the stop is smaller than a second axial distance L2 between the forwardmost tooth and the seal.

10. The fitting assembly according to claim 9, wherein:

each barbed tooth comprises circumferentially extending gap formed therein; and the gaps formed in the barbed teeth form a path that extends from a location forward of the barb arrangement to a location rear of the barb arrangement.

11. The fitting assembly according to claim 9, wherein:

the nipple is double-ended and comprises two nipple portions facing in opposite directions and having mirror symmetry about the stop, each nipple portion comprising a barb assembly, a seal and a rim which have unitary one-piece construction with the nipple.

12. The fitting assembly according claim 11, wherein:

each barbed tooth comprises circumferentially extending gap formed therein; and the gaps formed in the barbed teeth form a path that extends from a location forward of the barb arrangement to a location rear of the barb arrangement.

13. A fitting assembly for attachment to a pipe having an open rear end, the fitting assembly comprising a nipple and a clamp, the pipe being fitted with its open end facing axially rearwardly over the nipple, the clamp being adapted to fit over the pipe where the pipe fits over the nipple, the nipple comprising a seal, a barb arrangement and a stop arranged in order from front to rear, the barb arrangement comprising a plurality of axially spaced apart barbed teeth located rearward of the seal, the forwardmost barbed tooth of the plurality of barbed teeth being spaced from the stop by a distance L1 and spaced from the seal by a distance L2, L2 being greater than L1;

the seal and the barb arrangement being adapted to contact an inner face of the pipe, and the clamp having an axial extension that is sized to overlie the barb arrangement and the seal so that it can be tightened to press the pipe against the barb arrangement and the seal.

* * * * *